Feb. 16, 1932.  L. J. BIRN  1,845,222
HOE
Filed April 19, 1929
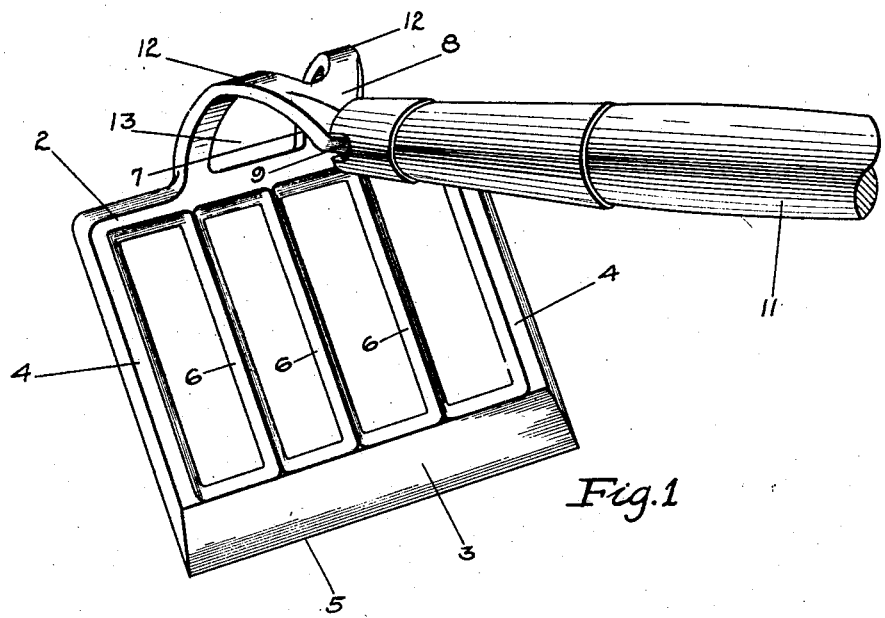
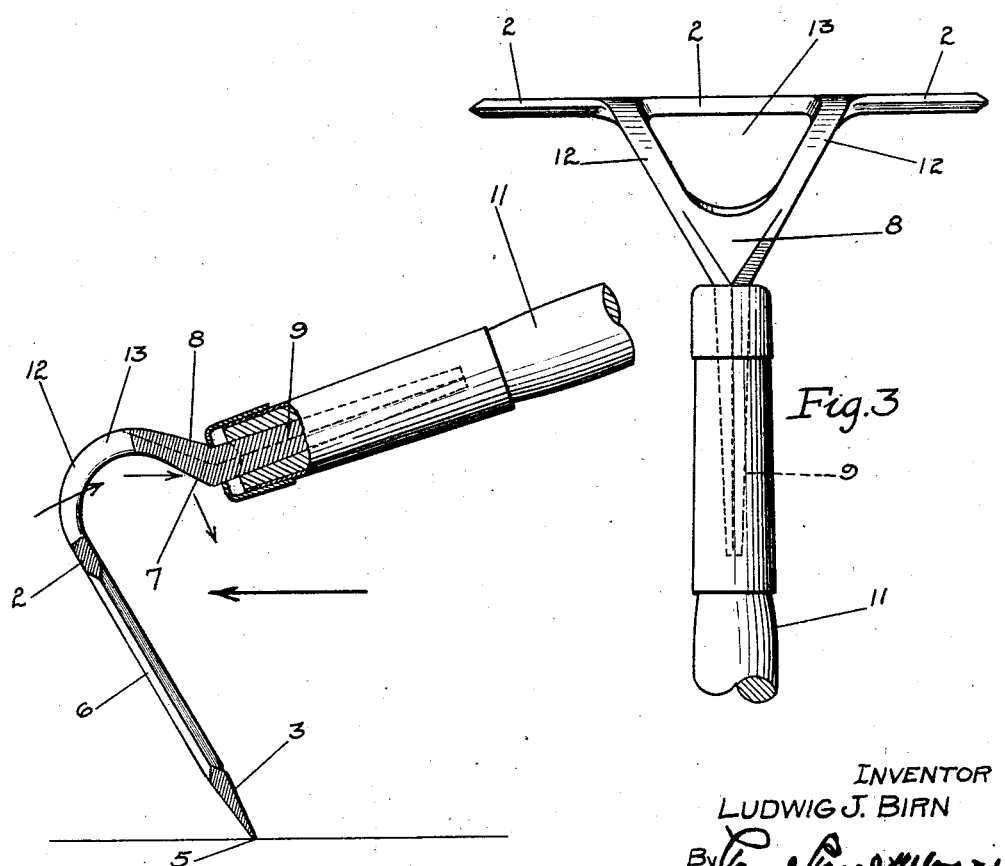
INVENTOR
LUDWIG J. BIRN
ATTORNEYS Patented Feb. 16, 1932

1,845,222

UNITED STATES PATENT OFFICE

LUDWIG J. BIRN, OF MINNEAPOLIS, MINNESOTA

HOE

Application filed April 19, 1929. Serial No. 356,357.

This invention relates to new and useful improvements in hoes and more particularly to hoes adapted for mixing cement, mortar, and other materials, and is an improvement over the form disclosed in my patent, No. 1,167,971, issued January 11, 1916.

An object of the present invention is to provide a hoe having an open frame provided with an extension adapted to have a handle secured thereto, and an inclined face being provided in the connection between said frame and extension, adapted to engage and divert portions of the material downwardly, as the hoe is moved forwardly through the material to be mixed, whereby the material will be more thoroughly agitated and mixed, per stroke of the hoe, thus expediting the operation of mixing the material.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings;

Figure 1 is a perspective view of my improved hoe;

Figure 2 is a sectional elevation of the hoe; and

Figure 3 is a plan view of Figure 2.

The body of the novel hoe featured in this invention comprises an open frame work composed of upper and lower horizontal frame members 2 and 3, respectively, and vertical end members 4, connecting together the members 2 and 3. The lower frame member 3 is relatively wider than the other frame members, and is gradually tapered downwardly to provide substantially a knife edge 5, whereby the hoe may be used for agricultural purposes. The upper corners of the member 3, and also the corners of the members 2 and 4, are preferably beveled off, as shown in Figures 1 and 2.

A plurality of upright bars 6, preferably diamond shaped in cross section, are interposed between the horizontal frame members 2 and 3. The oppositely disposed edges of the bars 6 operate to efficiently divide the material through which the hoe is passed, and reduce the resistance to the operation or movement of the hoe through the material, which is particularly noticeable when mixing material that is rather thick.

An important feature of the invention resides in the means provided in connection with the open frame for increasing the agitation and mixing of the material, as the hoe is passed therethrough. This means is best shown in Figure 2, and comprises an inclined face 7, formed at the jointure between an extension or shank 9, and a pair of divergent arms 12, integrally formed therewith. A handle 11 is adapted to be secured to the shank 9, as shown.

The arms 8 are arched, as shown in Figure 2, and the opposite ends thereof are secured to the upper horizontal member 2 of the open frame work. The aperture 13, defined by the inner edges of the divergent arms 12 and the upper edge of the central portion of the frame member 2, provides a passage for the material, as indicated by the small arrows in Figure 2.

When the hoe is moved through the material in the direction indicated by the large arrow, portions of the material, when in a flowing state, will pass through the aperture 13 and impinge against the inclined face 7, whereby it will be diverted downwardly, and portions of it spread sidewardly, into the mass of material, resulting in an increased agitation and more thorough mixing of the material. It will thus be seen that the inclined face 7 cooperates with the open frame to effect quicker mixing of a batch of material, in a given length of time, than can possibly be effected with an ordinary hoe, thereby shortening the time required for mixing each batch of material, with a corresponding decrease in the cost of labor.

I claim as my invention:

1. A hoe comprising a body portion composed of an open frame including upper and lower bars connected together by spaced-apart upright bars, a forked member secured to the upper bar and having means for securing a handle thereto, and means on said member positioned to be engaged by and divert downwardly, a portion of the material passing through said member.

2. A hoe comprising a body portion composed of an open frame including upper and lower bars connected together by a plurality of spaced-apart upright bars of diamond-shaped cross-section, a member secured to the upper bar and having means for attaching a handle thereto, and means on said member adapted to divert downwardly, a portion of the material passing over said top bar, when the hoe is moved in one direction, to expedite the operation of mixing.

3. A hoe comprising a body portion, a forked member secured to the upper portion of said body and having means for attaching a handle thereto, and means on said member positioned to be engaged by and divert downwardly, a portion of the material passing over said body portion and through said member.

4. A mixing hoe comprising a body portion, a forked member secured to the upper portion of said body portion and having means for attaching a handle thereto, and an enlarged surface on said member adapted to divert downwardly, a portion of the material passing over said body portion and through said member, when the hoe is moved in one direction, thereby to expedite the operation of mixing.

In witness whereof, I have hereunto set my hand this 16th day of April, 1929.

LUDWIG J. BIRN.